(No Model.) 2 Sheets—Sheet 1.

A. NOËL.
SPEED INDICATOR FOR BICYCLES, &c.

No. 540,510. Patented June 4, 1895.

WITNESSES:
Edward Thorpe
J. L. Saplinger

INVENTOR
A. Noël
BY
Munn & Co.
ATTORNEYS.

(No Model.) 2 Sheets—Sheet 2.
A. NOËL.
SPEED INDICATOR FOR BICYCLES, &c.
No. 540,510. Patented June 4, 1895.
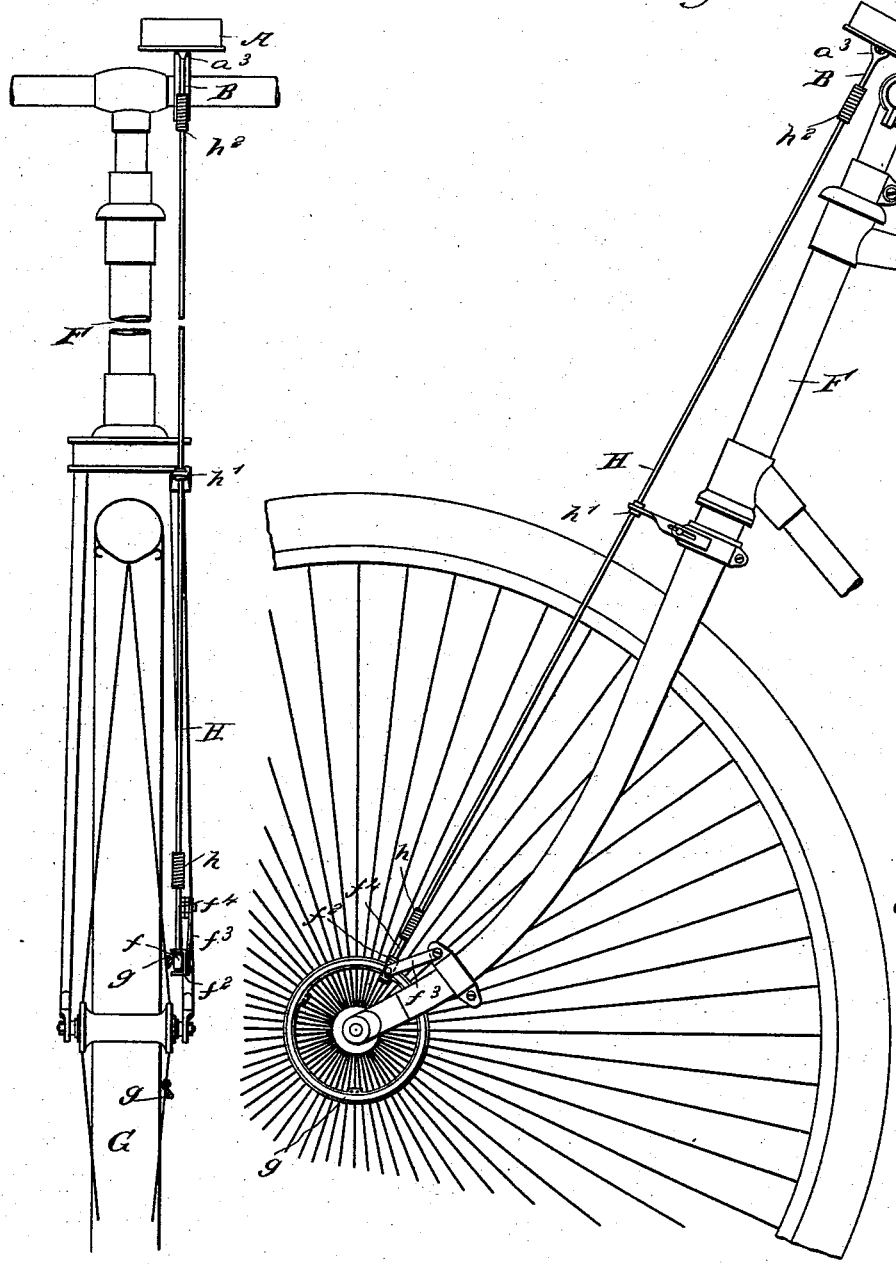
WITNESSES:
Edward Thorpe
INVENTOR
A. Noël
BY
Munn & Co
ATTORNEYS.
THE NORRIS PETERS CO., PHOTO-LITHO., WASHINGTON, D. C.

UNITED STATES PATENT OFFICE.

ANDRÉ NOEL, OF PARIS, FRANCE.

SPEED-INDICATOR FOR BICYCLES, &c.

SPECIFICATION forming part of Letters Patent No. 540,510, dated June 4, 1895.

Application filed January 30, 1895. Serial No. 536,651. (No model.) Patented in France March 5, 1894, No. 236,735.

*To all whom it may concern:*

Be it known that I, ANDRÉ NOËL, engineer, a citizen of the Republic of France, residing in Paris, France, have invented a new and useful Speed-Indicator for Cycles and other Wheeled Vehicles, (for which I have obtained a French patent, dated March 5, 1894, No. 236,735,) of which the following is a specification.

The invention relates to certain improvements in speed indicators for bicycles and similar vehicles, and has for its object to provide a device of a simple, durable and inexpensive character, adapted to indicate at all times the speed at which the vehicle may be moving, together with means whereby the indicator may be conveniently mounted on and driven from the vehicle, all as will be hereinafter fully set forth.

The novel features of the invention will be carefully defined in the claims.

In the accompanying drawings which serve to illustrate my invention I have shown the same applied for use to a bicycle.

Figure 3:
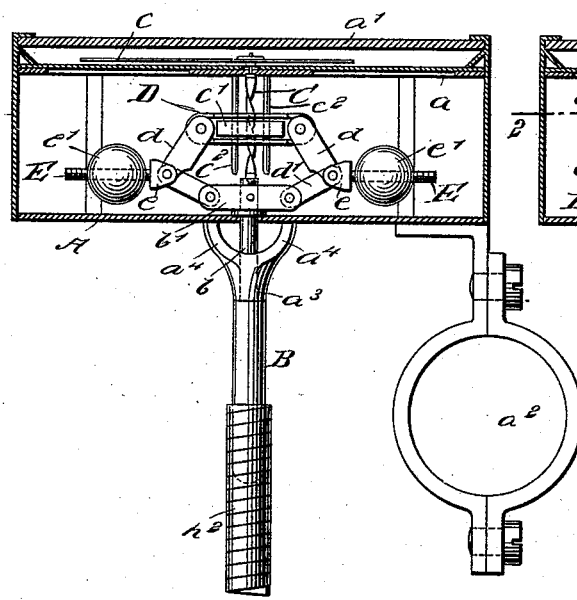
Figure 1:
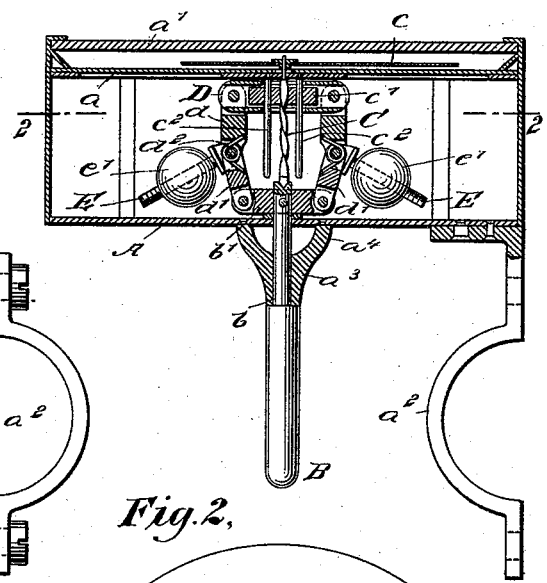
Figure 2:
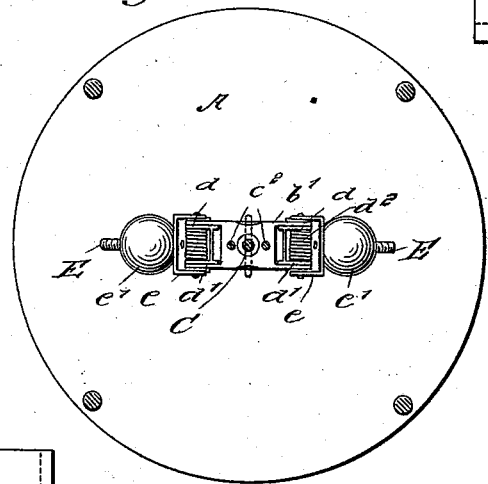
Figure 4:
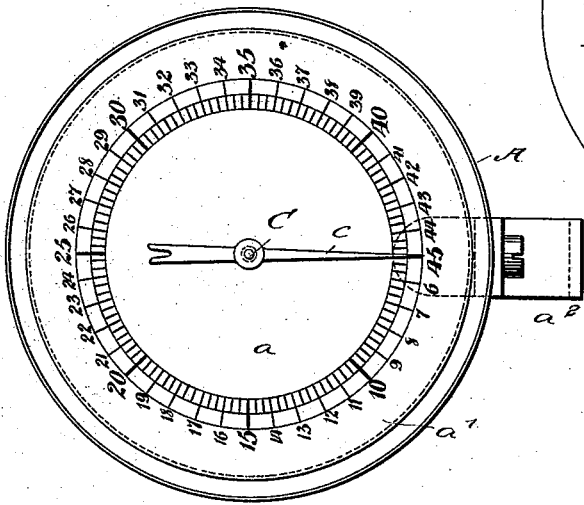

In the drawings, Figure 1 is a vertical axial section taken through the indicating mechanism, and Fig. 2 is a horizontal section taken through the same in the plane indicated by the line 2 2 in Fig. 1. Fig. 3 is a view similar to Fig. 1, but showing the operating parts in another position. Fig. 4 is a plan or face view of the indicator, showing the dial thereof. Fig. 5 is a side elevation of the portion of the frame and front wheel of a bicycle having my improved indicator mounted in place for use; and Fig. 6 is an end view of the bicycle, similar to Fig. 5, portions of the device being in section.

In the drawings, A represents the casing of the indicator, of circular form provided with a dial $a$ arranged across its upper portion, said dial being graduated to indicate miles or other units of distance, and being covered with a glass protecting plate $a'$, as clearly seen in Figs. 1 and 3.

The casing A is mounted in any preferred manner on the vehicle, as by means of the clamping ring $a^2$, and at the central part of its under side a bearing piece $a^3$ is fixed being tubular in form and bifurcated at its upper end, the bifurcations $a^4$ being adapted to pass through perforations formed in the bottom plate of the casing, inside which they are riveted down as indicated in Fig. 1.

A vertical shaft B, having a rounded lower extremity is provided with a reduced upper part $b$ rotatively mounted in said bearing $a^3$, the upper end of said reduced portion $b$ of the shaft extending inside the casing A and being provided with a collar $b'$, pinned fast thereto and provided with diametrically opposite arms.

At its extremity, the reduced portion $b$ of shaft B is provided with a coned bearing to receive the lower end of a screw stem C, the upper end of which is journaled at the center of the dial $a$ and extends through the same, being provided with an index $c$, as clearly seen, adapted to play over the graduations of the dial to indicate the speed at which the vehicle is moving, and inside the casing a vertically movable nut $c'$ provided with a screw threaded bore, is mounted on said screw stem, being held against rotary movement by pins $c^2$ depending vertically from the under side of the dial plate $a$, said nut being movable vertically on said pins as will be readily understood.

The nut $c'$ is loosely inclosed in a yoke or collar D having arms located similarly to the arms or wings of the collar $b'$, and connected to said arms by links $d$, $d'$, arranged in pairs, each pair of links being pivoted together at their inner ends and to one arm on each collar at their outer ends as clearly seen. The links of each pair are held normally aligned with each other, as seen in Fig. 1 by springs $d^2$, and to each pair of links is pivoted a screw threaded pin E having forks $e$ straddling the links $d$, $d'$, at their pivot points and provided with adjustable weights or balls $e'$, as clearly seen.

In operation, the shaft B is driven from some moving part of the vehicle, and as the speed of the vehicle varies, the weights $e'$ will be thrown out horizontally to a greater or less extent, so as to cause the collar D to approach more or less near the collar $b'$, whereby the nut $c'$ is caused to move vertically on the pins $c^2$ so as to impart rotary movement to the screw stem C and cause the index $c$ to play over the graduations on the dial, to indicate the speed.

The means for driving my improved indicator is clearly shown in Figs. 5 and 6, wherein F represents the front fork of a bicycle and G the front wheel carried therein, and provided with a crown wheel $g$, secured to one side thereof concentric with its hub, and gearing with a pinion $f$ mounted in a frame $f^2$ provided with a spring $f^3$ secured to the frame F and adapted to hold the pinion in gear with the crown wheel. The shaft $f^4$ of the pinion projects from the frame $f^2$ and is adapted to be inserted in an elastic socket $h$ formed on the lower end of a connecting rod or shaft H, having a central bearing $h'$, adjustably mounted in the bicycle frame. The upper end of the shaft H is also provided with an elastic socket $h^2$ to receive the end of shaft B, said sockets being formed of coiled wires as clearly seen.

I do not wish to be understood as limiting myself to the precise construction and arrangement of the device as herein shown, for it is evident that some change may be made therein without material departure from the principles of my invention.

Having thus described my invention, I claim as new and desire to secure by Letters Patent—

1. In a speed indicator, the combination of a case having a dial, a screw shaft having an index to play over the dial, a non-rotative nut movable longitudinally of the screw shaft, a driving shaft, a collar rotatably mounted on the nut and movable therewith longitudinally of the screw shaft, links pivotally connected together at their inner ends and having their outer ends pivotally connected to the collar and to the driving shaft respectively, springs coiled upon the pivot pins of the links and adapted to hold the same in one position, and adjustable weights carried by the links and adapted when the driving shaft is rotated to be acted on by centrifugal force to move the links to the other position, substantially as set forth.

2. In a speed indicator, the combination of a casing having a dial, a screw shaft having an index to play over the dial, a non-rotative nut movable longitudinally of the screw shaft, a driving shaft, a collar rotatably mounted on the nut and movable therewith longitudinally of the screw shaft, links, connected at their ends with the collar and the driving shaft respectively, said links having their adjacent ends pivotally connected together and provided with springs, screw threaded arms having bifurcations pivotally connected to the links at their pivot points, and weights screwing on said arms, substantially as set forth.

3. In a speed indicator, the combination of a casing having a dial, a screw shaft having an index to play over the dial, pins depending from the under side of the dial parallel to and on opposite sides of the screw shaft, a non-rotative nut movable longitudinally of the screw shaft and guided on said pins, a driving shaft, a collar rotatably mounted on the nut and movable therewith longitudinally of the screw shaft, links connected at their ends with the collar and driving shaft respectively, said links having their adjacent ends pivotally connected, and weights secured to the pivoted ends of the links, substantially as set forth.

In testimony whereof I have signed my name to this specification in the presence of two subscribing witnesses.

ANDRÉ NOËL.

Witnesses:
LÉON CRANCKENS,
CLYDE SHROPSHIRE.